(12) United States Patent
Kakura et al.

(10) Patent No.: US 6,415,141 B1
(45) Date of Patent: Jul. 2, 2002

(54) DIVERSITY RECEIVER AND METHOD BY DETECTING SIGNAL STRENGTHS IN SUCCESSIVE STAGES

(75) Inventors: Yoshikazu Kakura; Tomoki Osawa, both of Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/465,632

(22) Filed: Dec. 17, 1999

(30) Foreign Application Priority Data

Dec. 17, 1998 (JP) .......................................... 10-359063

(51) Int. Cl.[7] ................................................. H04B 1/06
(52) U.S. Cl. ................................. 455/277.1; 455/277.2; 375/347
(58) Field of Search ................................ 455/269, 270, 455/272, 275, 276.1, 277.1, 277.2, 562, 67.1, 101, 278.1; 342/422–437; 375/347

(56) References Cited

U.S. PATENT DOCUMENTS

| 5,203,023 | A | * | 4/1993 | Saito et al. | 375/332 |
|---|---|---|---|---|---|
| 5,918,164 | A | * | 6/1999 | Takahashi et al. | 455/134 |
| 5,952,963 | A | * | 9/1999 | Shen et al. | 342/367 |
| 5,991,613 | A | * | 11/1999 | Euscher et al. | 455/275 |
| 6,018,647 | A | * | 1/2000 | Fitzgerald | 455/135 |
| 6,023,615 | A | * | 2/2000 | Bruckert et al. | 348/14.08 |
| 6,032,033 | A | * | 2/2000 | Morris et al. | 370/334 |
| 6,330,433 | B1 | * | 12/2001 | Jager | 455/135 |

FOREIGN PATENT DOCUMENTS

JP    5-206903    8/1993

OTHER PUBLICATIONS

Japanese Office Action dated Jan. 18, 2002.

* cited by examiner

*Primary Examiner*—William Trost
*Assistant Examiner*—Simon Nguyen
(74) *Attorney, Agent, or Firm*—Dickstein, Shapiro, Morin & Oshinsky, LLP

(57) ABSTRACT

A diversify receiver comprises an antenna selector for selecting signals received by diversity antennas. Detection circuitry detects respective strengths of the selected signals and produces first and second strength indication signals. A mode selector is provided for selecting a reference threshold or the second strength indication signal. A comparator compares the output of the mode selector with the first strength indication signal. The mode selector is controlled to select the reference threshold so that the first strength indication signal is compared with the reference threshold and then to select the second strength indication signal in response to a first output signal of the comparator indicating that the first strength indication signal is higher than the reference threshold, so that the first strength indication signal is compared with the second strength indication signal. The antenna selector is then controlled according to a second output signal of the comparator indicating the result of the comparison between the first and second strength indication signals.

7 Claims, 5 Drawing Sheets

DIVERSITY RECEIVER AND METHOD BY DETECTING SIGNAL STRENGTHS IN SUCCESSIVE STAGES

BACKGROUND OF THE INVENTION

1. Field of the Invention

The present invention relates to a space diversity receiver for reception of a radio frequency signal received via different propagation paths using, antennas mutually spaced so their signals are uncorrelated with each other and selection of one of the signals according to their relative signal strengths.

2. Description of the Related Art

In a conventional diversity receiver, at, least two comparators are employed. One of the comparators is used for constantly monitoring the signal strength of in antenna signal with a reference threshold and the other is used for determining one of antenna signals based on their relative strength values. However, it is desirable to reduce the number of comparators.

SUMMARY OF THE INVENTION

It is therefore an object of the present invention to provide a diversity receiver and method which requires a reduced number of comparators.

According to a first aspect, the present invention provides a diversity receiver having a plurality of diversity antennas for producing antenna signals. The diversity receiver comprises a first selector for selecting the antenna signals, and detection circuitry for detecting respective strengths of the selected antenna signals and producing therefrom first and second strength indication signals. A second selector is provided for selecting a reference threshold or the second strength, indication signal. Comparator circuitry compares an output signal of the second selector with the first strength indication signal. A control circuit controls the second selector to select the reference threshold so that the first strength indication signal is compared with the reference threshold and controls the second selector to select the second strength indication signal in response to a first output signal of the comparator circuitry indicating that the first strength indication signal is higher than the reference threshold. So that the first strength indication signal is compared with the second strength indication signal. The control circuit controls the first selector according to a second output signal of the comparator circuitry indicating a result of comparison between the first and second strength indication signals.

According to a second aspect, :he present invention provides a diversity receiver having a plurality of diversity antennas for producing antenna signals, comprising a first selector for selecting the antenna signals, detection circuitry for detecting respective strengths of the selected antenna signals and producing therefrom a plurality of strength indication signals, a second selector for selecting a reference threshold during a first mode and selecting one of the strength indication signals during a second mode, comparator circuitry for comparing, during the first mode, the reference threshold selected by the second selector with one of the strength indication signals and determining, during, the second mode, a maximum value of the plurality of strength indication signals including the one strength indication signal selected by the second selector and a control circuit for controlling the second selector to operate in the first mode and subsequently controlling the accused selector to operate in the second mode in response to a first output signal of the comparator circuitry indicating that the one strength indication signal is higher than the reference threshold, and controlling the first selector according to a second output signal of the comparator circuitry identifying one of the antenna signals corresponding to the strength indication signal of the maximum value.

According to a third aspect, the present invention provides a method of selecting antenna signals of a plurality of diversity antennas The method comprises the steps of (a) selecting one of the antenna signals, (b) detecting a strength of the selected antenna signal and producing therefrom a first strength indication signal, (c) comparing the first strength indication signal with a reference threshold, (d) repeating the steps (a) and (b) to produce second and third strength indication signals if the first strength indication signal is higher than the reference threshold, (e) performing a comparison between the second and third strength indication signal, and (f) selecting one of the antenna signals according to a result of the comparison by the step (e).

According to a fourth aspect, the present invention provides a method of selecting antenna signals of a plurality of diversity antennas. The method comprises (a) selecting one of the antenna signals, (b) detecting a strength of the selected antenna signal and producing therefrom a strength indication signal, (c) comparing the strength indication signal with a reference threshold, (d) repeating the steps (a) and (b) to produce a plurality of strength indication signals if the strength indication signal is higher than the reference threshold, (e) determining a maximum value of the plurality of strength indication signals and identifying one of the antenna signals corresponding to the strength indication signal of the maximum value, and (f) selecting the identified antenna signal.

BRIEF DESCRIPTION OF THE DRAWINGS

The present invention will be described in further detail with reference to the accompanying drawings, in which.

DETAILED DESCRIPTION

Figure 1:
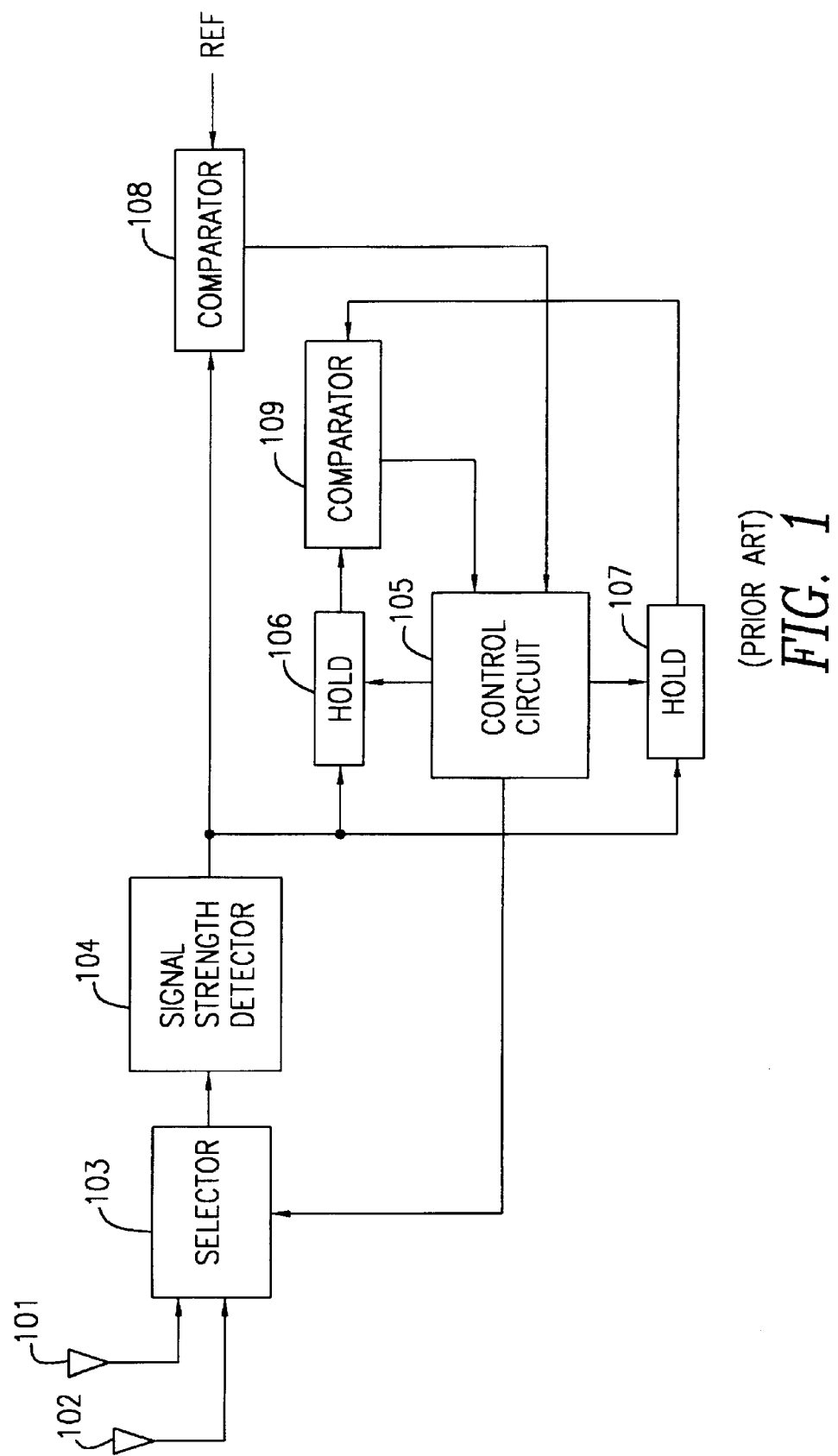
FIG. 1 is a block diagram of a prior art diversity receiver.

Before proceeding with the description of the present invention, reference is first made to FIG. 1 in which the prior art diversity receiver is illustrated.

The prior art diversity receiver includes a pair of antennas 101 and 102 spaced at such a distance that the output signals of both antennas vary independently of each other. One of the outputs of the antennas is selected by a control circuit 105. The selected antenna signal feeds a signal strength detector 104 to produce a signal indicating the field strength of the selected radio-frequency signal. The field strength signal is supplied to hold circuits 106 and 107 and a comparator 108, which compares it with a reference threshold REF. The logical value of the output of comparator 109 is used by the control circuit 105 to determine whether the selected antenna output has exceeded the threshold REF. If it is determined that the selected antenna signal has exceeded the threshold, the control circuit 105 causes the antenna selector 103 to alternately select the antennas and concurrently causes the hold circuits 105 and 106 to hold the signals from the antenna 101 and 102, respectively. The signals stored respectively in the hold circuits 106 and 107 are compared with each other by a comparator 109. Depending on the logic value of the comparator output, the control circuit 105 causes the antenna selector 103 to continuously select the antenna from which the signal of higher field strength is detected until the comparator 108 detects that the field strength of the selected signal is lower than the threshold REF.

However, the use of two comparators adds to the complexity of the diversity receiver.

Figure 2:
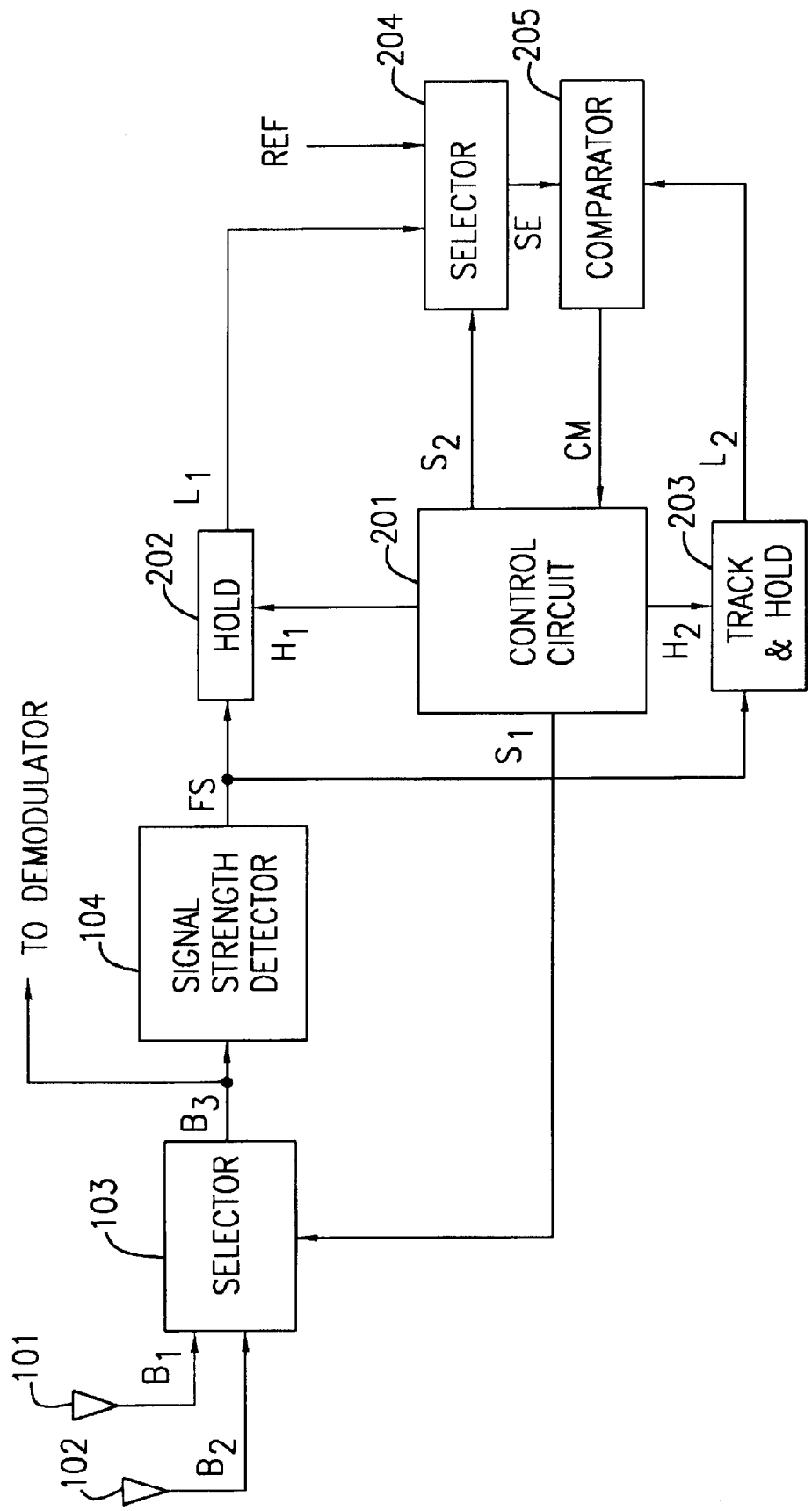
FIG. 2 is a block diagram of a diversity receiver according to a first embodiment of the present invention.

A diversity receiver according to a first embodiment of the present invention is illustrated in FIG. 2 in which the same numerals are used to designate corresponding elements of FIG. 1. The diversity receiver of this invention is particularly suitable for reception of burst signals.

In FIG. 2, the control circuit 201 supplies an antenna switching command signal $S_1$ to the selector 101 to cause it to alternately supply burst signals $B_1$ and $B_2$ from the antennas 101 and 102 to the signal strength detector 104 as a selected burst signal B5. The output of the antenna selector 103 is also connected to a demodulator, not shown.

A hold circuit 202 and a track-and-hold circuit 203 are connected to the signal strength detector 104 to receive the field strength signal FS. Normally, the track-and-hold circuit 203 is in a tracking mode in which its output varies with the amplitude of the field strength signal. The hold circuit 202 and track-and-hold circuit 203 are in a hold mode when they receive hold command signals $H_1$ and $H_2$ from the control circuit 201.

The output signals $L_1$ and $L_2$ of hold circuit 202 and track-and-hold circuit 203 are connected to a mode selector 204 and a comparator 205, respectively. Mode selector 204 is also supplied with the reference threshold to selectively couple one of its inputs to the comparator 205 according to the logic level of a switching command signal $S_2$ supplied from the control circuit 201. Comparator 205 compares the output signal SE of mode selector 204 with the output signal $L_2$ of track-and-hold circuit 203 and supplies a comparator output CM to the control circuit 201 to indicate the result of the comparison.

Control circuit 201 uses the output of comparator 205 during a clock period of significance such as when the diversity receiver is in a "burst detect mode" or in an "antenna select mode".

Figure 3:
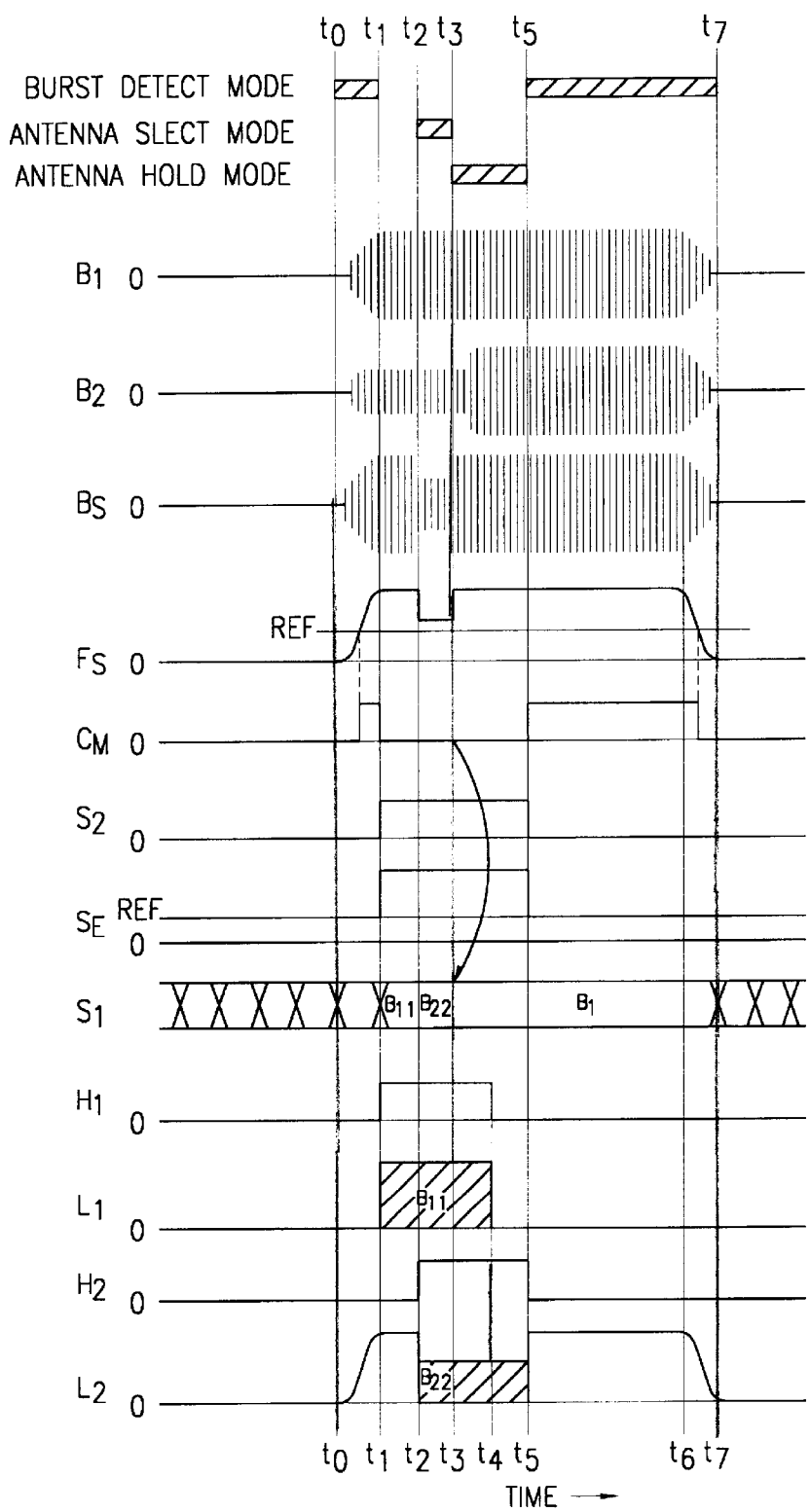
FIG. 3 is a timing diagram of the operation of the diversity receiver of FIG. 2.

The operation of the diversity receiver of FIG. 2 will be described below with the aid of a timing diagram shown in FIG. 3 by assuming that a burst signal arrives at time $t_0$ over different propagation paths so that the antenna 101 produces a burst signal $B_1$ initially having a high amplitude pattern during times $t_0$ and $t_6$ and a low amplitude pattern during times $t_6$ and $t_9$, while the antenna 102 produces a burst signal $B_2$ initially having a low amplitude pattern during times $t_0$ and $t_6$ and a high amplitude pattern during times $t_6$ and $t_9$.

During a standby mode prior to time $t_0$, the control circuit 201 generates a series of antenna switching command pulses $S_1$ to the antenna selector 103 to cause it to alternatively, switch between antennas 101 and 102 to hunt for burst signals $B_1$ and $B_2$. Specifically, the antenna 101 is selected when the switching command signal $S_1$ is low and the antenna 102 is selected when the signal $S_1$ is high. Because of the absence of a burst signal during the time prior to $t_0$, the strength detector 104 produces a zero-level output signal FS. Control circuit 201 produces no hold command signals $H_1$ and $H_2$ and sets the mode select command signal $S_2$ low to cause the mode selector 204 to switch to the burst detect position for selecting the threshold REF. Thus, the track-and-hold circuit 203 a operating in a tracking mode, producing zero-level output signal $L_2$ and the mode selector 204 is coupling the reference threshold REF to the comparator 205. The output of the strength detector 104 is therefore coupled via the track-and-hold circuit 203 to the comparator 205, where it is compared with the reference threshold REF. Comparator 205 produces a zero-level output signal during the standby period.

At time $t_0$, the switching command signal $S_1$ is set high to select the burst signal $B_2$. The field strength signal FS of the selected burst signal is passed through the tracking-mode hold circuit 203 to the comparator 205 and compared with the threshold REF. The field strength signal FS exceeds the threshold REF and the comparator 205 output CM goes high, indicating that 2 burst signal is detected.

The time interval between times $t_0$ and $t_1$ is defined as a period of the diversity receiver operating in a first "burst detect mode".

With the comparator output CM being high, the antenna switching command signal $S_1$ is set low at time $t_1$ to select a burst sample $B_{11}$ of the burst signal $B_1$ and concurrently the mode switching signal $S_2$ is set high to switch the mode selector 204 to an "antenna select" position. In addition, the hold command signal $H_1$ is set high to hold the field strength value of the burst sample $B_{11}$.

At time $t_2$, the antenna switching signal $S_1$ is set high for sampling a burst sample $B_{22}$ of he burst signal $B_2$ and the hold command signal $H_2$ is set high to hold the burst sample $B_{22}$ in the track-and-hold circuit 203. Since the output signal $L_1$ of the hold circuit 202 represents the high signal strength value of the burst sample $B_{11}$ and the output signal $L_2$ of the track-and-hold circuit 203 represents the low signal strength value of the burst sample $B_{22}$, the output CM of comparator 205 is low.

During the antenna select mode between times $t_2$ and $t_3$, the control circuit 201 responds to the comparator low-level output CM for recognizing that the burst sample $B_{11}$ is stronger than the burst sample $B_{22}$ and sets the antenna switching command signal $S_1$ low to hold the antenna selector 103 in the upper position to select the burst signal $B_1$.

With the burst signal $B_1$ being selected, the hold command signals $H_1$ and $H_2$ are reset low at times $t_4$ and $t_5$, respectively.

Control circuit 201 then initiates a search for the end timing of the burst during the interval $t_5$ and $t_7$. This is achieved by setting the switching command signal $S_2$ low to cause the mode selector 204 to move to the burst detect position so that its output signal SE is set equal to the reference threshold REF. Since the burst signal $B_1$ is continuously selected, the field strength value of the burst signal $B_1$ is passed to the comparator 205 through the track-and-hold circuit 203 operating in a tracking mode, the comparator output CM goes high at time $t_5$, indicating that the burst signal is still present. During the interval between $t_6$ and $t_7$, the burst signal $B_1$ becomes lower than the threshold REF, and hence the output of the comparator 205 goes low. Control circuit 201 recognizes it as the end timing of the burst and begins to produce a series of antenna switching command pulses $S_1$ at time $t_7$ in search of the next burst signal.

Instead of the burst detection mode of operation during interval $t_5$ to $t_7$, the mode selector 204 may be switched to the burst detect position it time $t_6$ if the length of the burst is known in advance. For example, if the burst signal is transmitted in a packet network, the diversity receiver may be informed of the length of a packet. Using the packet length data, the diversity receiver sets a timer at the start timing of a burst and switches the mode selector 204 to the burst detect mode for detecting the end timing of the burst when the timer expires.

It is seen from the foregoing that the signal strength detector 104, the hold circuit 202 and the track-and-hold circuit 203 constitute a detection circuit that detects signal strengths of the selecting antenna signals and produce strength signals corresponding to the selected antenna signals.

Figure 4:
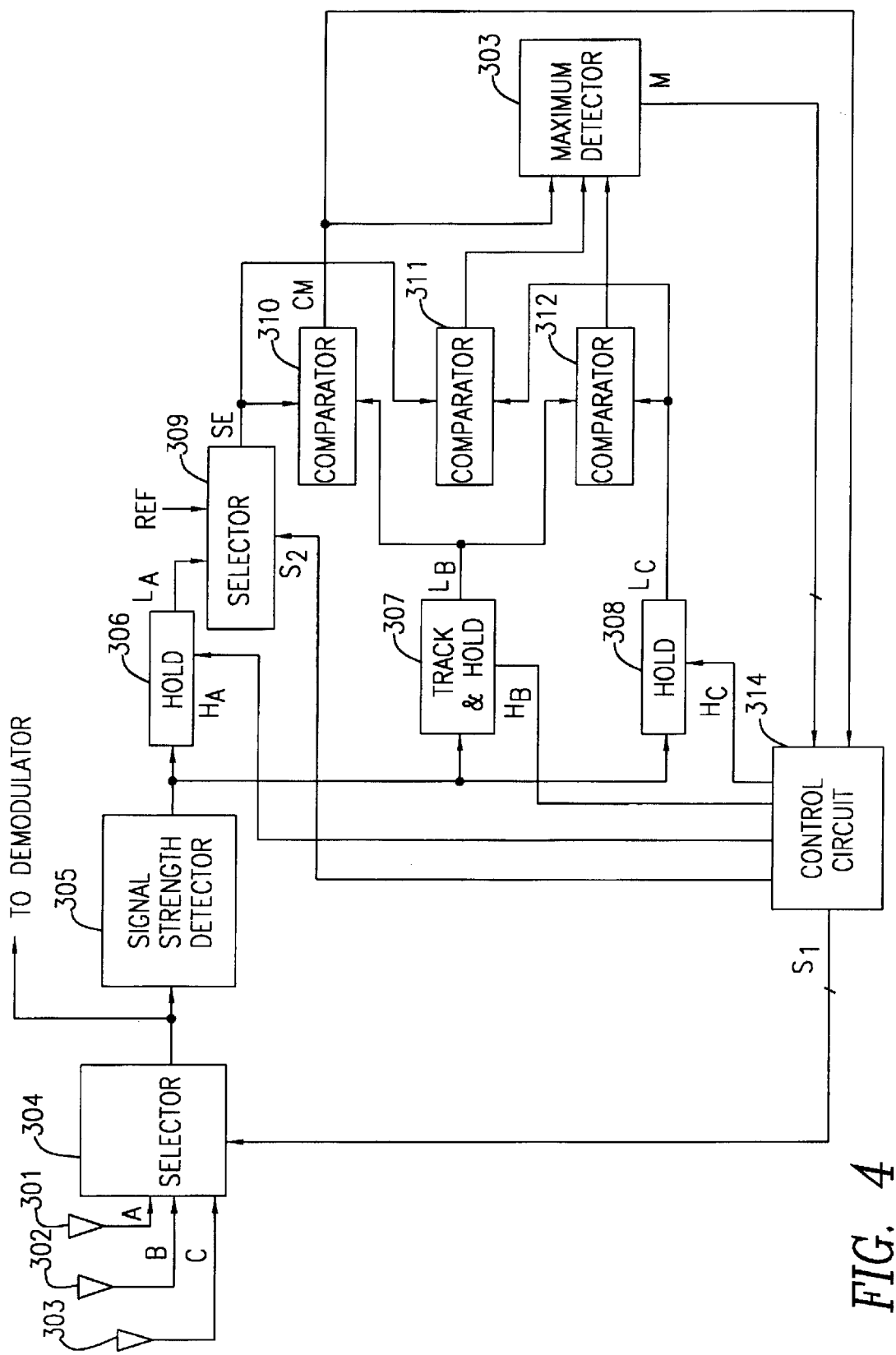
FIG. 4 is a block diagram of a diversity receiver according to a second embodiment of the present invention.

FIG. 4 is a block diagram of a second embodiment of the diversity receiver of the present invention In which more than two antennas are used in the illustrated example, three antennas 301, 302 and 302 are employed to produce burst signals A, B and C, respectively. An antenna selector 304 selectively couples one of the outputs of these antennas to a signal strength detector 303 according to an antenna identifying signal $S_1$. The output of the signal strength detector 305 is applied to hold circuits 306, 308 and a track-and-hold circuit 307.

The output ($L_A$) of hold circuit 306 is connected to a mode selector 309 to which the reference threshold REF is also applied. One of its inputs is selected as a signal SE and coupled to a first comparator 310 to which the output ($L_B$) of track-and-hold 307 is also connected. A second comparator 311 is provided for making a comparison between the output (SE) of selector 309 and the output ($L_C$) of hold circuit 308. The outputs $L_B$ and $L_C$ of track-and-hold circuit 307 and hold circuit 308 are compared with each other by a third comparator 312.

A maximum detector 313 is connected to the comparators 310, 311 and 312 to determine the highest of the field strength values during the antenna select mode to produce a signal M identifying the antenna that is producing the burst signal of highest strength.

The output of the first comparator 310 is connected to a control circuit 314. During a burst detect clock period, the control circuit 314 responds to a high-level comparator output CM for setting the mode select signal $S_2$ high to cause the mode selector 309 to switch to the burst detect position. Concurrently, the control circuit 314 supplies a hold command signal $H_A$ to the hold circuit 306. Control circuit 314 supplies an antenna hold signal $S_1$ in response to the signal M from the maximum detector 313.

Figure 5:
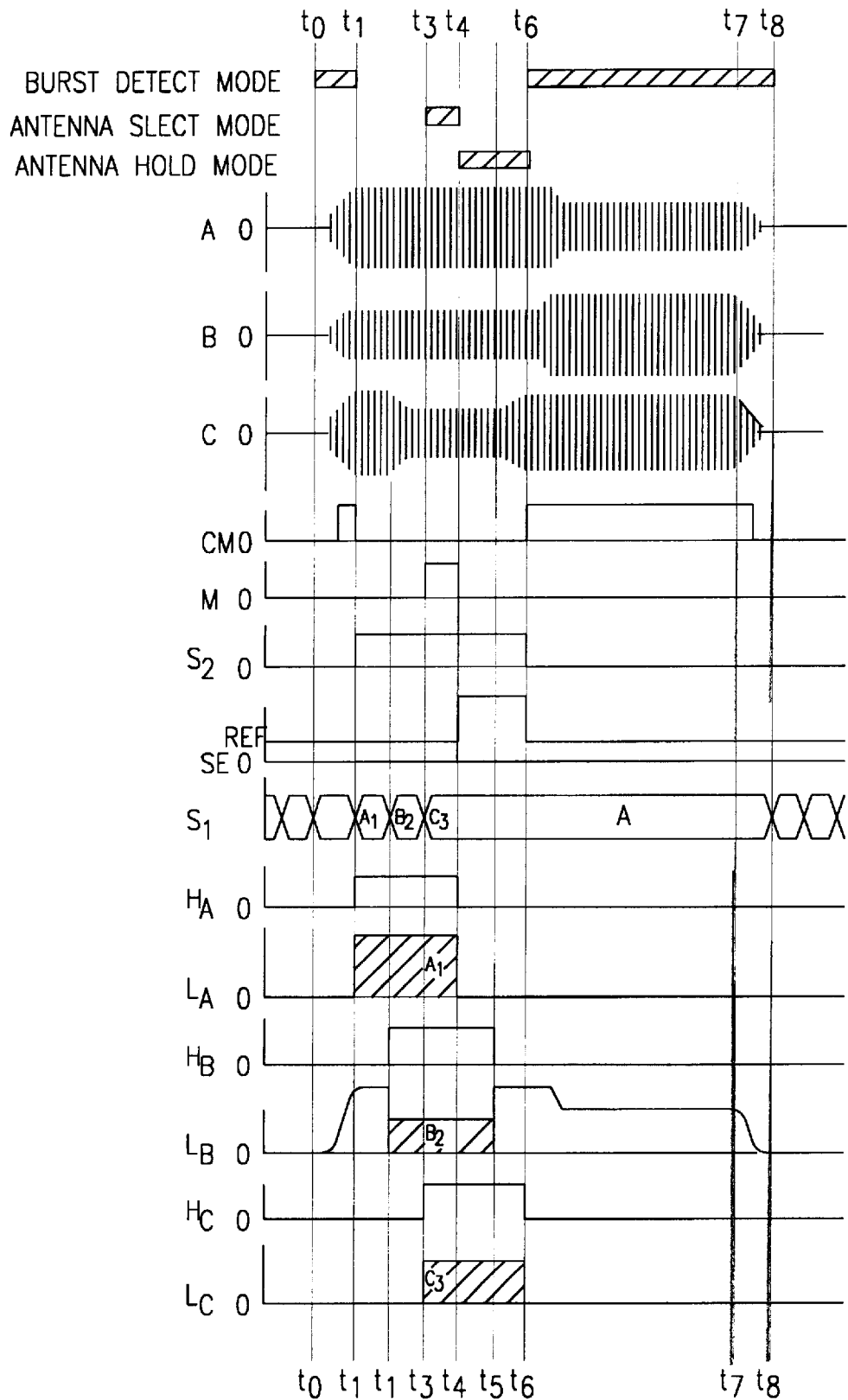
FIG. 5 is a timing diagram of the operation of the diversity receiver of FIG. 4.

The operation of the diversity receiver of FIG. 4 proceeds as shown in FIG. 5.

During a stand by mode prior to time the control circuit 314 generates a series of antenna identifying signals is to the antenna selector 304 to cause it to sequentially switch the antennas 301, 302 and 303 to hunt for burst signals A, B and C. Because of the absence of a burst signal during the time prior to $L_0$ the strength detector 305 produces a zero-level output signal and the control circuit 314 produces no hold command signals and sets the mode select signal is to low level so that the reference threshold REF is selected. Thus, the track-and-hold circuit 307 is operating in a cracking mode, producing a zero-level output signal $L_B$. The output of the strength detector 305 is therefore coupled via the track-and-hold circuit 307 and the hold circuit 308 to the comparators 311 and 312, where they are compared with the reference threshold REF. Comparator 311 produces a zero-level output signal during the standby period.

At time $t_0$, a burst signal C, for example, is selected and the field strength signal FS of the selected burst is passed through the tracking-mode trick-and-hold circuit 307 to the comparator 310 and compared with the threshold REF. This field strength signal FS exceeds the threshold REF and the comparator 310, the comparator 310 produces a high-level output indicating that a burst signal is detected.

With the comparator output CM being high, a burst sample $A_1$ of the burst signal A is selected at time $t_1$, and concurrently the mode switching signal $S_2$ is set high to switch the mode selector 309 to the antenna select position. In addition, the hold command signal $H_A$ is set high to hold the field strength value of the burst sample $A_1$.

At time $t_2$, a burst sample $B_2$ of the burst signal B is selected and the hold command signal $H_B$ is set high to hold the burst sample $B_2$ in the track-and-hold circuit 307.

At time $t_3$, a burst sample $C_3$ of the burst signal C is selected and the hold command signal $H_C$ is set high to hold the burst sample $C_3$ in the hold circuit 308. Since the output signal $L_A$ of the hold circuit 306 represents the highest field strength value of the burst samples $A_1$, $B_2$ and $C_3$, the maximum detector 313 produces an output signal M identifying the antenna 301. Therefore, in the second embodiment, the antenna select mode occurs between times $t_1$ and $t_3$.

With the burst signal A being selected, the hold command signals $H_A$, $H_1$ and $H_C$ are reset low at times $t_4$, $t_5$ and $t_6$, respectively. As a result, burst signal A is selected during the antenna select interval $t_4$ to $t_6$.

Control circuit 314 initiates a search for the end timing of the burst signal A during the interval $t_6$ and $t_8$ by setting the switching command signal $S_2$ low. Mode selector 309 is switched to the burst detect position and its output signal SE is set equal to the reference threshold REF. Since the burst signal A is continuously selected, the field strength value of this burst signal is passed to the comparator 310 through the track-and-hold circuit 307 operating in a tracking mode, the comparator output CM goes high at time $t_6$, indicating that the burst signal is still present. During the interval between $t_7$ and $t_8$, the burst signal A becomes lower than the threshold REF, and hence the output of the comparator 310 goes low. In response to the low-level output CM, the control circuit 314 begins to produce a series of antenna identifying signals $S_1$ at time $t_8$ in search of the next burst.

What is claimed is:

1. A diversity receiver having a plurality of diversity antennas for producing antenna signals, comprising:

a first selector for selecting said antenna signals;

detection circuitry for detecting respective strengths of the selected antenna signals and producing Therefrom first and second strength indication signals;

a second selector for selecting a reference threshold or said second strength indication signal;

comparator circuitry for comparing in output signal of the second selector with said first strength indication signal; and a control circuit for controlling said second selector to select said reference threshold so that said first strength indication signal is compared with said reference threshold and controlling said second selector to select said second strength indication signal in response to a first output signal of the comparator circuitry indicating that said first strength indication signal is higher than said reference threshold, so that said first strength indication signal is compared with said second strength indication signal, said control circuit controlling said first selector according to a second output signal of the comparator circuitry indicating a result of comparison between said first and second strength indication signals.

2. A diversity receiver as claimed in claim 1, wherein said detection circuitry comprises:
   a signal strength detector connected to receive said selected antenna signals; and
   a sampling circuit for sampling in output signal of the signal strength detector.

3. A diversity receiver having a plurality of diversity antennas for producing antenna signals, comprising:
   a first selector for selecting said antenna signals;
   detection circuitry for detecting respective strengths of the selected interim, signals and producing therefrom a plurality of strength indication signals;
   a second selector for selecting a reference threshold during a first mode and selecting one of said strength indication signals during a second mode;
   comparator circuitry for comparing, during said first mode, the reference threshold selected by the second selector with one of said strength indication signals and determining, during said second mode, a maximum value of said plurality of strength indication signals including said one strength indication signal selected by the second selector; and
   a control circuit for controlling said second selector to operate in said first mode and subsequently controlling said second selector to operate in said second mode in response to a first output signal of the comparator circuitry indication that said one strength indication signal is higher, than said reference threshold, and controlling said first selector according to a second output signal of the comparator circuitry identifying one of said antenna signals corresponding to the strength indication signal of said maximum value.

4. A diversity receiver as claimed in claim 3, wherein said comparator circuitry comprises:
   a plurality of comparators, each comparator comparing between a pair of said strength indication signals; and
   a maximum detector for determining said maximum value from output signals of said comparators and identifying one of said strength indication signals corresponding to said maximum value.

5. A diversity receiver as claimed in claim 3, wherein said detection circuitry comprises:
   a signal strength detector connected to receive said selected antenna signals for detecting the strengths of the selected antenna signals; and
   a sampling circuit for sampling the detected strengths to produce said plurality of strength indication signals.

6. A method of selecting antenna signals or a plurality of diversity antennas, comprising the steps of:
   a) selecting one of said antenna signals;
   b) detecting a strength of the selected antenna signal and producing therefrom a first strength indication signal;
   c) comparing said first strength indication signal with a reference threshold;
   d) repeating the steps (a) and (b) to produce second and third strength indication signals if said first strength indication signal is higher than said reference threshold;
   e) performing a comparison between said second and third strength indication signals; and
   f) selecting uric of said antenna signals according to a result of the comparison by the step (e).

7. A method of selecting antenna signals of a plurality of diversity antennas, comprising the steps of:
   a) selecting one of said antenna signals;
   b) detecting a strength of the selecting antenna signal and producing therefrom a strength indication signal;
   c) comparing said strength indication signal with a reference threshold;
   d) repeating the steps (a) and (b) to produce a plurality of strength indication signals if said strength indication signal is higher than said reference threshold;
   e) determining a maximum value of said plurality of strength indication signals and identifying one of said antenna signals corresponding to the strength indication signal of the maximum value; and
   f) selecting said identified antenna signal.

* * * * *